United States Patent

[11] 3,589,391

| [72] | Inventor | Ettore Pagliaro<br>Via Uruguay 14, Milan, Italy |
|------|----------|---|
| [21] | Appl. No. | 822,196 |
| [22] | Filed | May 6, 1969 |
| [45] | Patented | June 29, 1971 |
| [32] | Priority | May 6, 1968 |
| [33] | | Italy |
| [31] | | 834468 |

[54] ELECTRICALLY OPERATED FLUID FLOW CONTROL VALVE DEVICE
8 Claims, 1 Drawing Fig.

[52] U.S. Cl. .................................................. 137/493.8,
137/599, 251/139
[51] Int. Cl. ................................................. F16k 17/18
[50] Field of Search.......................................... 137/493.6,
493.8, 493.9, 596.16, 596.17, 599, 625.64,
625.65; 251/83, 139

[56] References Cited
UNITED STATES PATENTS
2,504,435  4/1950  Matteson...................... 137/599 X

| 2,798,769 | 7/1957 | Whitson ...................... | 251/139 X |
| 2,863,473 | 12/1958 | Gantz ......................... | 251/139 X |
| 3,173,646 | 3/1965 | Wilcox ........................ | 251/139 X |
| 3,324,889 | 6/1967 | Batts ........................... | 251/139 X |

FOREIGN PATENTS
1,179,068  10/1964  Germany...................... 137/625.65

Primary Examiner—Robert G. Nilson
Attorney—Edwin E. Greigg

ABSTRACT: An electrically operated valve device for controlling fluid flow therethrough comprising a casing which houses a central stationary core surrounded by an energizing coil, a movable slave core on each side of the central core, and a spring-loaded valve member in each movable core to control fluid flow through axial passages in the central core. Deflectors are provided in the movable cores to shield the valve members against fluid flow, and fluid pressure may be employed to assist the valve members whose spring loading can be selected to determine the control effect of the valve device.

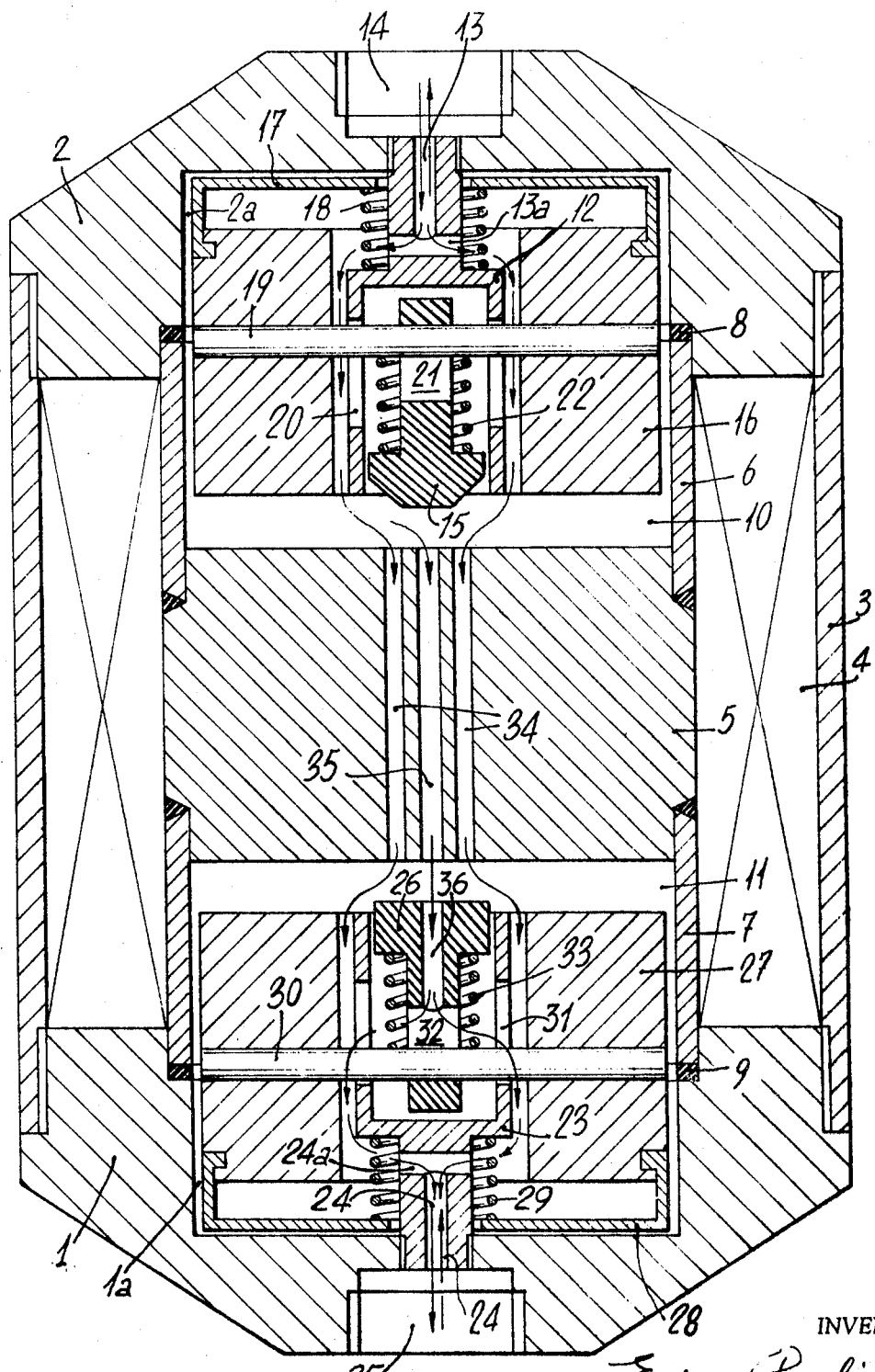

3,589,391

ELECTRICALLY OPERATED FLUID FLOW CONTROL VALVE DEVICE

BACKGROUND OF THE INVENTION

This invention relates to an electrically operated valve device intended to control the flow of fluids of various types.

Electrically operated fluid flow control valve devices of various kinds are, of course, well known. It is however a disadvantage in many such valve devices which are not of complex construction that a relatively large operating current is required to overcome the pressure of the fluid being controlled. It is a further disadvantage with this type of valve device that it may be necessary to employ relatively costly or otherwise unsuitable nonmagnetic materials in the construction of major parts of such valve devices, since magnetic materials in such parts might interfere with the electromagnetic operation of, for example, slave cores.

A first object of the present invention is to provide a valve device of the above kind in which, in the closed state of the valve, the fluid flow passageway is closed partly due to direct electromagnetic effect and partly due to the pressure of the fluid itself. This results in a considerable reduction of electric power input in comparison with previously known devices of this type.

A second object of the present invention is to provide a valve device of the above kind which does not require the use of nonmagnetic parts which are generally provided in conventional devices in order to prevent the movable core being attracted in a sense opposed to that of the fixed core.

Other objects of the present invention are to provide a valve device of the aforesaid type which is of particularly compact construction and therefore may be of very small dimensions, which is efficient in operation, which has a long life even without maintenance, and which has a low cost of production.

SUMMARY OF THE INVENTION

According to the present invention there is provided an electrically operated valve device for controlling fluid flow therethrough, the device comprising a casing containing two axially spaced chambers; a fixed magnetic core between said chambers and formed with first and second passageways which interconnect said chambers; a movable magnetic core slidably mounted in each of said chambers; a first valve member carried by one of said movable cores to control said first passageway; and a second valve member carried by the other of said movable cores to control said second passageway.

Preferably, said casing comprises a pair of end closure members each formed with a connector opening, and a pair of sleeves of nonmagnetic material extend outwardly from said fixed core, said chambers being defined by said core, said sleeves and said end members, and said movable cores being respectively accommodated in said chambers.

Preferably also, at least one of said movable cores is separated from said end members by a spacer of nonmagnetic material to screen that movable core.

BRIEF DESCRIPTION OF THE DRAWINGS

The drawing is a diagrammatic axial section of one form of electrically operated fluid flow control valve device according to the present invention.

DESCRIPTION OF THE PREFERRED EMBODIMENT

Referring to the drawing, it will be seen that the valve device according to the present invention comprises two end members 1 and 2 securely interconnected by a screw connection provided by a tubular casing 3. An electromagnetic coil 4 is interposed between said end members. In wide the coil there is located a fixed central electromagnetic core 5 of cylindrical shape. The core is secured to the inner ends of two sleeves 6 and 7, of ferromagnetic material. Both sleeves have their outer ends inserted into an annular recess formed in the two end members 1 and 2, with the interposition of annular packings 8 and 9.

In the members 1 and 2 there are provided cavities 1a and 2a, respectively, which, together with the two sleeves 6 and 7 and the central core 5, define chambers 11 and 10 which receive the fluid passing through the device, as will be later described.

As a result of the clamping action between casing 3 and the members 1 and 2, the packings 8 and 9 render the chambers 11 and 10 fluidtight.

Inside the chamber 10, a deflector 12 is secured to the flange 2 and is formed with a passage 13 which forms a communication between connector opening 14 (intended for connection to a fluid circuit) and the chamber 10. A series of radial openings 13a open from the part of passage 13 contained in chamber 10, in such a manner that the fluid flow, which was originally axial, passes out in the radial direction or is reversed, that is to say in the direction of cap 17.

The cup-shaped deflector 12 carries in its central cavity a valve member 15 of any suitable sealing material, as will later be described.

A slidably movable core 16 is also provided in the chamber 10. This core has a cylindrical cavity which forms, with the deflector 12, a substantially annular space sufficiently large to permit the passage of the fluid.

At its end adjacent to the member 2, the movable core 16 is secured to the spacer cap 17 which is formed of nonmagnetic material. The cap also serves as an abutment for the outer end of compression spring 18 which, at its inner ends, engages a shoulder provided for this purpose on the deflector 12. It should be noted that the formation of cap 17 of nonmagnetic material (as will be explained hereinbelow) prevents the exertion on the movable core 16 of a magnetic attraction in opposition to that applied by the central core 5, when the coil 4 is energized. For this reason, it is unnecessary to employ at each end of the sleeve 6 closure means of nonmagnetic material as in conventional constructions of this general kind. It follows that it is possible to have members 1 and 2 formed entirely of magnetic material, and the electric valve device is "screened."

The spring 18 urges the cap 17 against the member 2 in such a manner that the movable core 16 is held apart from the fixed core 5. A pin 19, or equivalent connecting member, passes diametrically through said core 16 and through two apertures 20 provided in the sidewall of the deflector 12. The pin 19 also passes through an elongated aperture 21 provided in the stem of the valve member 15 so that, although joined to the pin, the valve member 15 can move axially to a limited extent. The valve member 15 is held in relation to the pin 19 by a compression spring 22 which extends between the pin 19 and a shoulder provided for that purpose on the valve member 15, so that the valve member is urged towards the core 5. Thus, a forward movement of the movable core 16, towards the core 5, also effects a forward movement of the valve member 15 which is pushed by the pin 19 through the medium of the spring 22.

The chamber 11 contains elements equivalent to those in chamber 10, and the observations made regarding the elements in chamber 10 apply substantially to the elements in chamber 11. Briefly, these elements include deflector 23 and its respective passage 24 and radial holes 24a, this passage being in communication with connector 25, valve member 26, movable core 27, nonmagnetic cap 28, spring 29, pin 30, and spring 33.

Like the valve member 15, the valve member 26 has an axial passage 36 which leads into a diametrical aperture 32 through which the above-mentioned pin 30 passes.

In the central portion of the core 5 there are provided two longitudinal passages 34 and 35 which are independent of one another. The passage 34 may have an interrupted annular section or may be composed of a series of longitudinally extending concentric bores, or it may comprise both of these possible forms. The second passage, that is to say the passage 35, is a simple longitudinal bore along the axis of the core 5. The two passages 34 and 35 interconnect the chambers 10 and 11 independently of each other. The purpose of the valve member 15 is to close only the pipe 35, leaving the passage 34 open and the purpose of the valve member 26 is to close only the passage 34, leaving open the passage 35. For this purpose, an opening 36 is provided in said valve member 26 in such a manner that, even when this valve member is in its closed position, the passage 35 still remains in communication with the chamber 11, through the aperture 32 and apertures 31 in the deflector 23.

The operation of this valve device will now be described.

In the state of rest, which is the condition illustrated in the drawing, fluid can pass freely through the valve device both in the so-called "forward" direction indicated in the drawing by arrows in full lines, and in the opposite or "return" direction indicated by the arrows in broken lines. More specifically, fluid passing from the inlet connector 14 passes through the passage 13, from which it passes out radially and flows through the space between the deflector 12 and the movable core 16, thus reaching the chamber 10. It is to be noted that the deflector 12, which is shaped in the form of a cup and carries the valve 15 in its cavity, has the function of preventing the fluid flow originating from the connector 14 and directed in the forward direction towards the core 5, from driving the valve member 15 towards the core 5.

The radial holes 13a in the deflector also cooperate to this end by deflecting the current in a radial direction. Thus, the current is obliged to flow back in the longitudinal direction of the space between the deflector and the movable core and thus reacts against the cap 17 so as to urge the cap against the member 2.

In this manner, the movable core 16 made fast to the cap 17 is held in its position of rest, in addition to the action of the spring 18, thus preventing the valve member 15 which is joined to it from moving in the direction of the core 5.

From the chamber 10, the fluid flows through the passages 34 and 35 into the chamber 11 whence it passes through the space between the deflector 23 and the movable core 27, the holes 24a, and also the passage 24, until it reaches the outlet connector 25. In the return direction, that is to say from the connector 25 to the connector 14, the fluid flows over the same path but in the opposite direction. The arrangement for preventing movement of the valve member 15 is also applicable to the valve 26 when the fluid moves in the return direction. For this purpose, use is made in particular of the deflector 23 together with the passage 24 and the holes 24a, in the manner previously described with reference to the valve member 15.

When current is supplied to the electromagnetic coil 4, the core 5 attracts the two movable cores 16 and 27, overcoming the reaction of the respective springs 18 and 29. It is to be noted that the nonmagnetic spacer caps 17 and 28 reduce the magnetic fields entering the outer end surfaces of the movable cores 16 and 27, and which counteract the attraction of the core 5 on the respective movable cores 16 and 27 by creating an attraction opposite to that of said core 5.

The movements of the cores 16 and 27 are transmitted, through the pins 19 and 30 and the spring 22 and 23, to the valve members 15 and 26 both of which are displaced towards the core 5 to close the passages 35 and 34 respectively. In this position, fluid cannot pass from the chamber 10 to the chamber 11 (forward direction) through the passage 35, because the latter is closed by the valve member 15, the closing action of which can only be increased by the fluid pressure acting in the same direction. Moreover, fluid cannot pass through the passage 34, since the latter is closed by the valve member 26 unless the fluid pressure overcomes the action of the spring 33 which holds the valve member 26 closed. For the same reasons, fluid cannot pass from the chamber 11 to the chamber 10 (return direction) through the passage 34, because the closure of valve member 26 is assisted by the pressure of the fluid itself, nor can it pass through the passage 35 unless its pressure overcomes the action of the spring 22.

From the foregoing it will be appreciated that by suitably varying the loads of the two springs 22 and 33 acting on the respective valve members 15 and 26, and by suitably dimensioning the sections of the passages 34 and 35, it is possible, with the present electrically operated valve device, to obtain various results of which the principals are indicated below.

A. Bidirectional Closure.

When the device comes into operation it blocks completely both forward flow and return flow. This effect is achieved by employing springs 22 and 23 which produce a load greater than the maximum pressure of the fluid.

B. Unidirectional Closure.

When the device comes into operation, the fluid flow is blocked in only one direction, while it is free to flow in the opposite direction. This effect is achieved by reducing the load of the spring acting on the valve opposing the pressure of the fluid in the direction in which it is desired to enable the latter to flow freely. Thus, if it is desired to block only the return direction, it is sufficient to reduce the load of the spring 33, while on the other hand having a spring 22 with a load greater than the maximum pressure. In this manner, fluid flowing in the forward direction easily overcomes the resistance of the valve member 26, while the flow is blocked in the return direction because the fluid cannot pass either through the passage 34 since the latter is closed by the valve member 26 which is kept closed by the pressure itself, or through the passage 35 because the latter is closed by the valve member 15 which offers sufficient resistance to the maximum pressure.

C. Bidirectional Reduction of Flow.

For this operating condition, energization of the valve device causes the fluid to pass through a section which is reduced in relation to that which exists in the state of rest. This is achieved by suitably weakening both the springs 22 and 23, so that in each direction of flow the fluid easily overcomes one valve member while it is blocked by the other. In these circumstances, both in the forward direction and in the return direction, the fluid can pass only through the one of the two passages which is closed by the valve member which it is able to overcome; consequently it is obliged to pass through a section which is only part of the total section.

D. Unidirectional Reduction of Flow.

In this case, when the device is operating the fluid is free to pass at full flow in one direction, but its flow is reduced in the opposite direction. This is achieved as in paragraph C, but by providing the passage permitting full flow in the desired direction with a section equal to the maximum flow section.

E. Low Pressure Bidirectional Closure.

When the device is operating, fluid flow is blocked in both directions with limitation to a given value of the pressure which is lower than the maximum operating pressure. When this value is exceeded, the fluid passes from the chamber at the higher pressure to the chamber at the lower pressure. This effect is achieved by calibrating the springs of the two valve members 15 and 26 in accordance with the required limiting pressure.

F. Low Pressure Unidirectional Closure.

When the device comes into operation, the fluid is blocked in one direction only, while it is free to pass in the opposite direction provided that its pressure exceeds a certain predetermined value. This is achieved by one of the two springs having a load greater than the maximum pressure, while the other spring must be calibrated in accordance with the required limiting pressure.

G. Graduation of Pressure Drop in the Opening Phase.

In the opening phase, that is to say when the operating state ceases, the valve device according to the present invention makes it possible for the pressure drop to take place gradually and not abruptly, because between the closing phase (zero section) and the opening phase (maximum section) there is interposed an intermediate phase corresponding to a reduced section through which the flow of fluid is gradually reduced in pressure.

Referring again to the drawing, at the moment of the interruption of the supply of electric current to the coil 4 the two movable cores 16 and 27, which are no longer attracted by the core 5, tend to return to the position of rest. However, the movable core of the chamber in which the fluid under pressure is retained will return to rest only when this pressure is exhausted; this is achieved in the following manner. Assuming that the chamber under pressure is the chamber 11, at the moment of the opening of the electric circuit, the core 16, which is no longer attracted, is returned by the spring 18 to the position of rest. Consequently, the valve member 15 opens the passage 35 through which the pressure existing in the chamber 11 is discharged. Nevertheless, before being exhausted, this pressure continues to act on the valve member 26, forcing the latter to remain against its seat in the position in which it closes the passage 34. Thus, the core 27, which is connected to the valve member 26 through the pin 30, cannot return to its position of rest until the residual fluid pressure no longer acts on the valve member 26. It follows that, when the electromagnetic action has ceased, the fluid pressure cannot be discharged through the entire passage section of the valve device, that is to say through the two passages 34 and 35, but can be discharged only through one of them. Consequently, in the opening phase, the pressure drop takes place gradually and in proportion to the restriction of the pressure discharge passages.

From the above description it is obvious that the valve device described fully achieves the aims which were set out in the introductory part of this specification. It is to be confirmed that the use of the nonmagnetic spacer caps 17 and 28 makes it unnecessary to use nonmagnetic stoppers applied axially to the end members 1 and 2, in contradistinction with conventional devices. Modifications and variations may be made to the device described without departing from the scope of the present invention.

We claim:

1. An electrically operated valve device for controlling fluid flow therethrough, the device comprising a casing containing two axially spaced chambers; a fixed magnetic core between said chambers and formed with first and second passageways which interconnect said chambers; a movable magnetic core slidably mounted at each of said chambers; a first valve member carried by one of said movable cores to control said first passageway; and a second valve member carried by the other of said movable cores to control said second passageway.

2. A valve device according to claim 1, in which said casing comprises a pair of end closure members each formed with a connector opening, and a pair of sleeves of nonmagnetic material extend outwardly from said fixed core, said chambers being defined by said fixed core, said sleeves, and said end members, and said movable cores being respectively accommodated in said chambers.

3. A valve device according to claim 1, in which a fixed deflector is mounted in at least one of said chambers to prevent the corresponding valve member being driven towards the fixed core by the fluid flow.

4. A valve device according to claim 3, in which said deflector is substantially cup-shaped and comprises a shaft within which extends an axial passage connected to the aperture in the corresponding flange and terminating in a plurality of radial holes, the deflector being accommodated in an axial opening of larger diameter which is formed in the corresponding movable core, to form a space for passage of the fluid.

5. A valve device according to claim 1, in which at least one of the two movable cores is spaced apart from the casing end member of magnetic material by means of a nonmagnetic spacer to prevent attraction of that movable core which is opposed to the action of the central core during the energization phase.

6. A valve device according to claim 2, in which said casing comprises a cylindrical shell and two end members tightly clamped to ends of said shell, said end members also engaging the nonmagnetic spacer sleeves extending from the fixed core.

7. A valve device according to claim 3, in which means are provided in each movable core for controlling the respective valve member which is formed with a head and a stem, said means each comprising a pin which passes diametrically through the core and through axial openings in the respective deflector mounted in the chamber and in an opening provided in the valve stem accommodated in the deflector, and a spring inserted between said pin and the head of the valve.

8. A valve device according to claim 2, in which a spring is inserted between the spacer and the respective deflector.